United States Patent
Wymore et al.

(10) Patent No.: US 10,266,104 B2
(45) Date of Patent: Apr. 23, 2019

(54) UNIVERSAL MULTI AXIS ADJUSTABLE WINDSHIELD LIGHT BAR AND MOUNTING SYSTEM

(71) Applicant: Iddea California, LLC, Brea, CA (US)

(72) Inventors: Timothy J. Wymore, Brea, CA (US); Rodolfo A. Linares, Brea, CA (US)

(73) Assignee: Iddea California, LLC, Brea, CA (US)

( * ) Notice: Subject to any disclaimer, the term of this patent is extended or adjusted under 35 U.S.C. 154(b) by 0 days.

(21) Appl. No.: 15/795,495

(22) Filed: Oct. 27, 2017

(65) Prior Publication Data

US 2018/0118091 A1     May 3, 2018

Related U.S. Application Data

(60) Provisional application No. 62/414,245, filed on Oct. 28, 2016.

(51) Int. Cl.

| *F21V 19/02* | (2006.01) |
| *B60Q 1/04* | (2006.01) |
| *B60Q 1/18* | (2006.01) |
| *B60Q 1/068* | (2006.01) |
| *F21S 4/28* | (2016.01) |

(52) U.S. Cl.
CPC .......... *B60Q 1/0483* (2013.01); *B60Q 1/068* (2013.01); *B60Q 1/18* (2013.01); *F21S 4/28* (2016.01)

(58) Field of Classification Search
CPC .......... B60Q 1/04; B60Q 1/0483; B60Q 1/18; F21S 4/28; F21V 21/26; F21V 21/29; F21V 21/30
USPC .................. 362/197, 239, 249.04, 249.1, 427
See application file for complete search history.

(56) References Cited

U.S. PATENT DOCUMENTS

| 3,934,134 | A | * | 1/1976 | Wassel ................. B60Q 1/0035 362/549 |
| 4,722,030 | A | | 1/1988 | Bowden |
| 9,096,172 | B2 | * | 8/2015 | Cotta, Sr. ................. B60Q 1/18 |
| 2017/0120805 | A1 | * | 5/2017 | Marchese ............ B60Q 1/2611 |

* cited by examiner

*Primary Examiner* — Diane I Lee
*Assistant Examiner* — Keith G. Delahoussaye
(74) *Attorney, Agent, or Firm* — Stetina Brunda Garred and Brucker

(57) ABSTRACT

An adjustable mounting device is provided comprising a base mount assembly including a first base mount and a second base mount pivotally coupled to each other, with the first base mount and the second base mount each being configured to be attachable to the vehicle. A light mount is pivotally coupled to the base mount assembly and is configured to be attachable to the light bar for mounting the light bar on the vehicle.

16 Claims, 13 Drawing Sheets

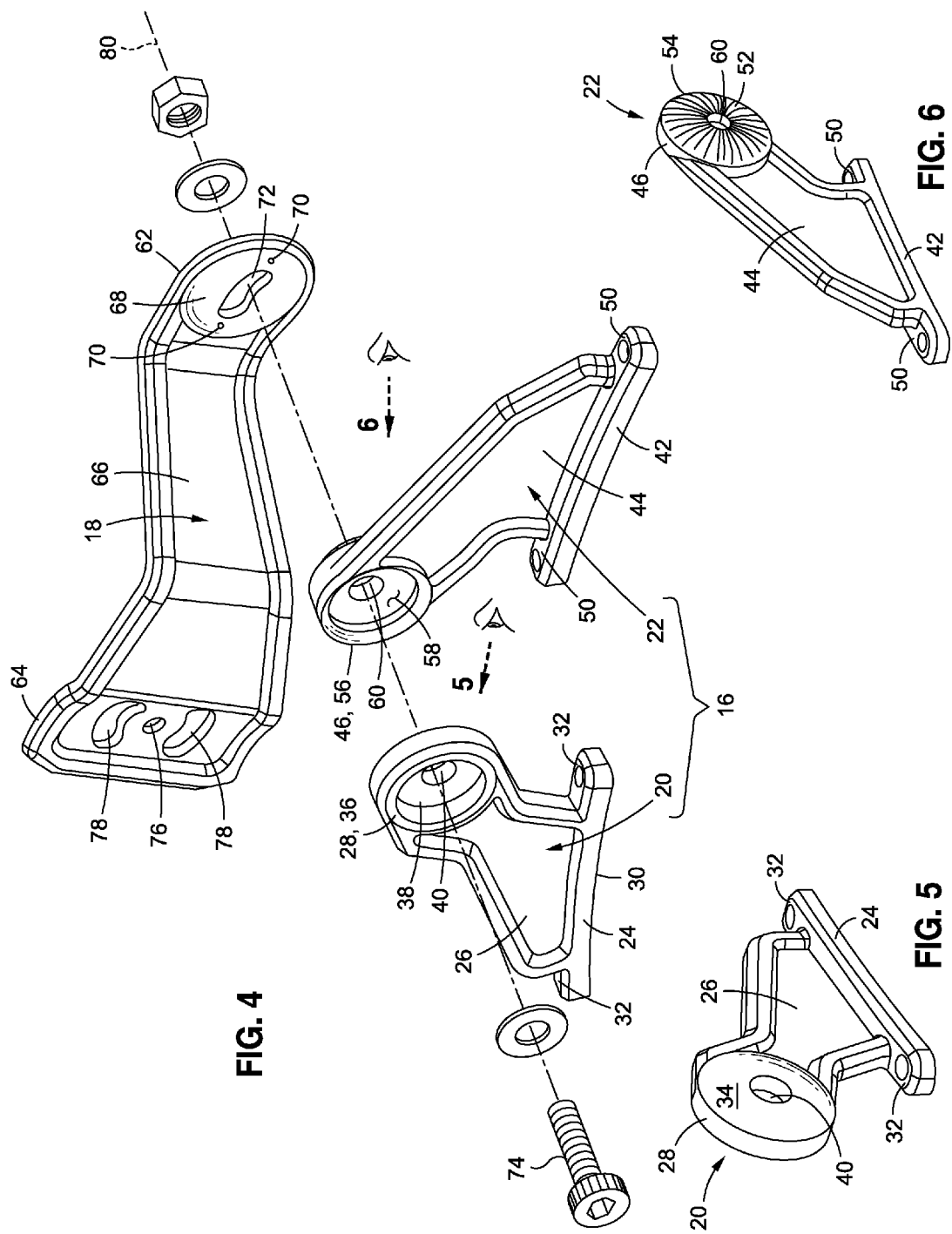

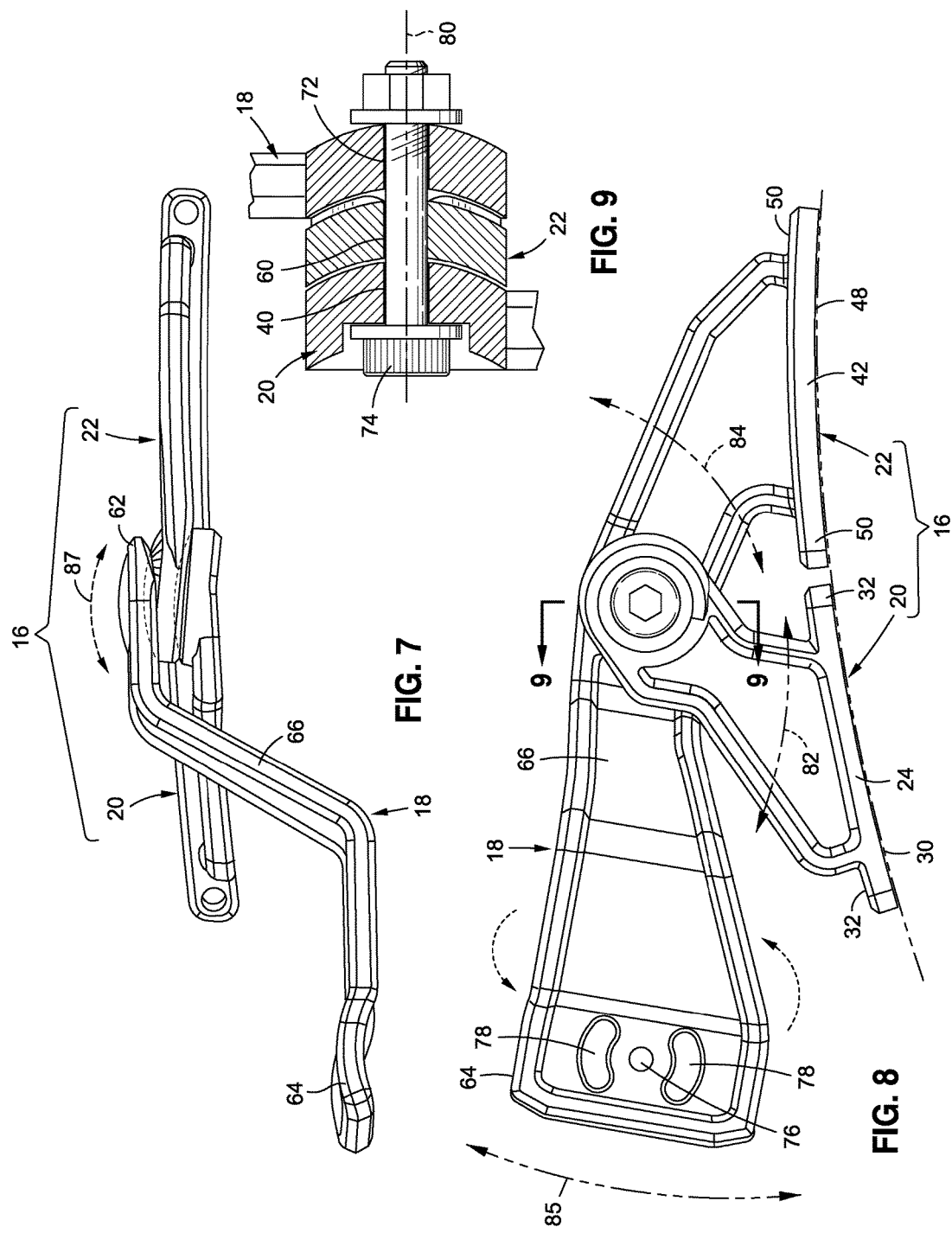

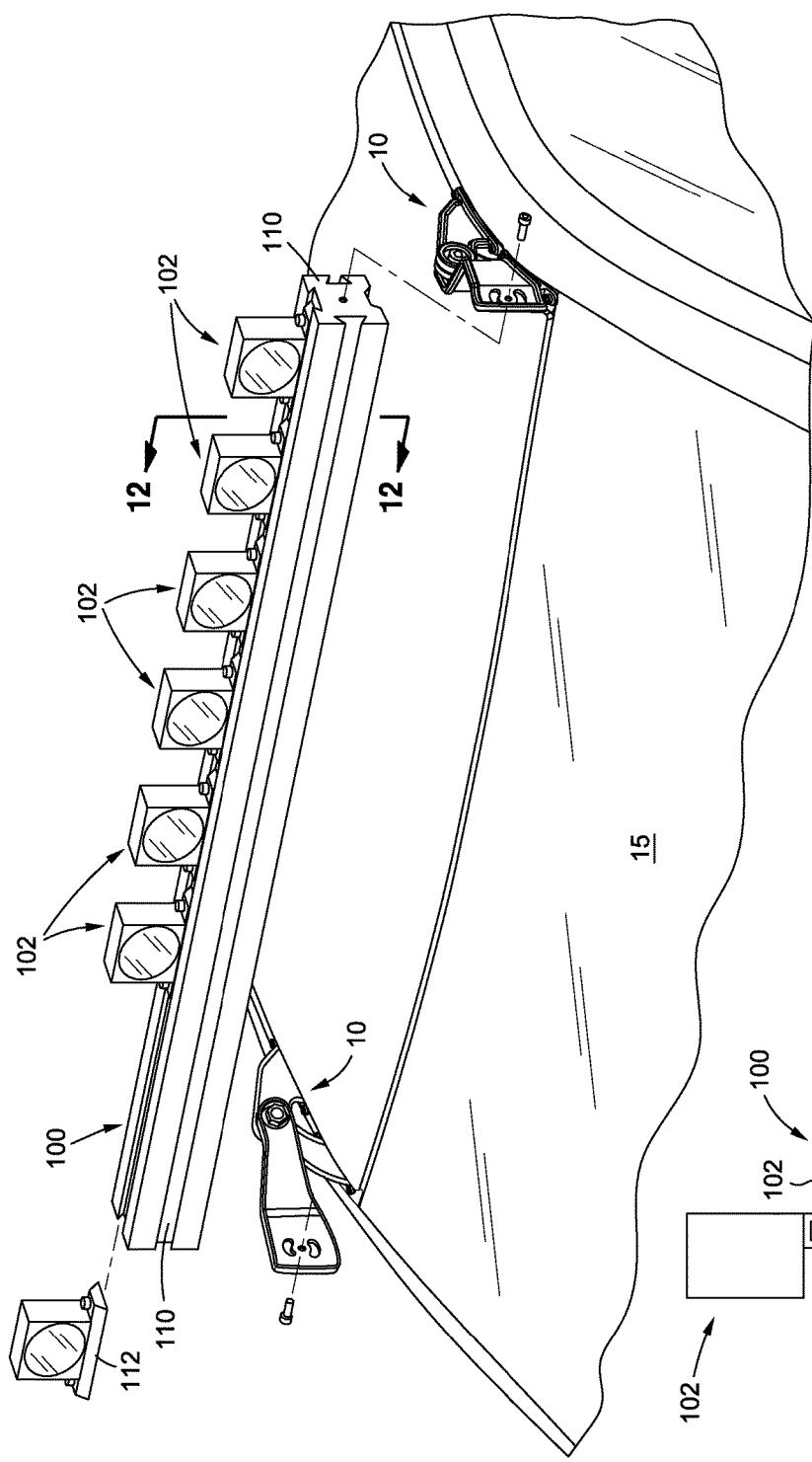
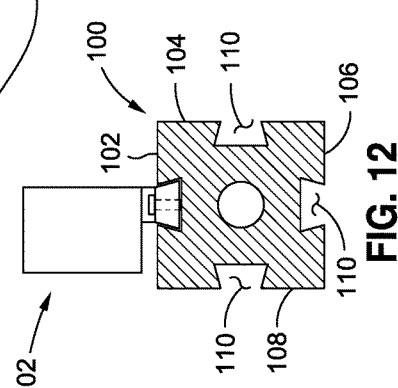
FIG. 11
FIG. 12

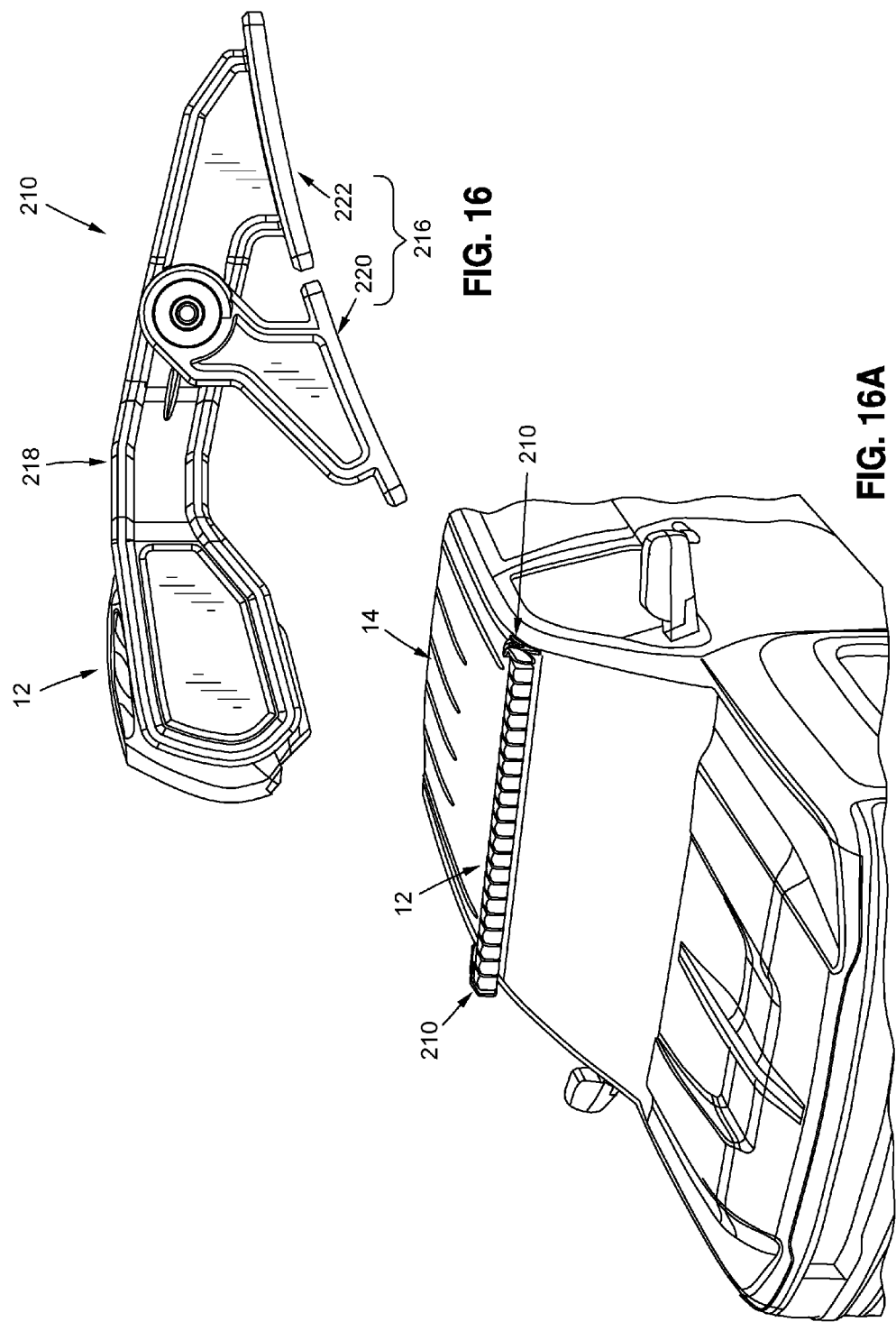

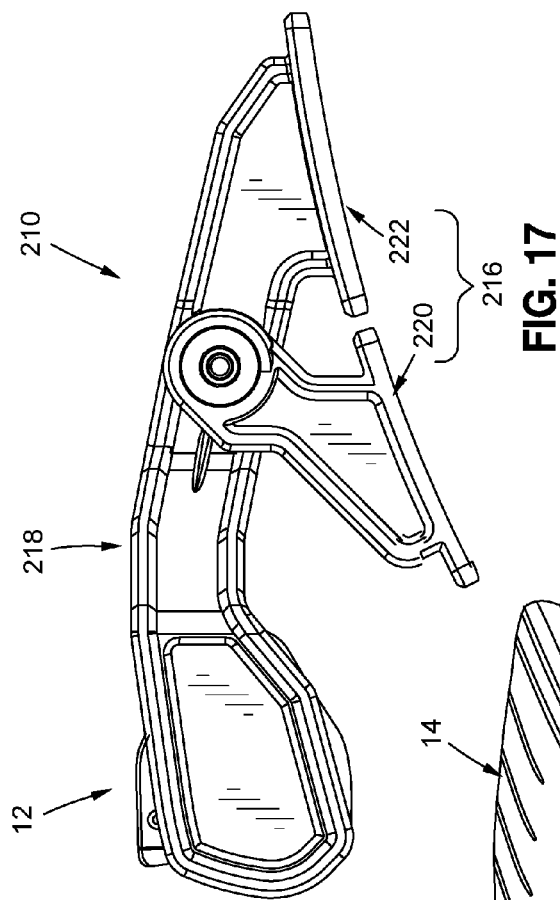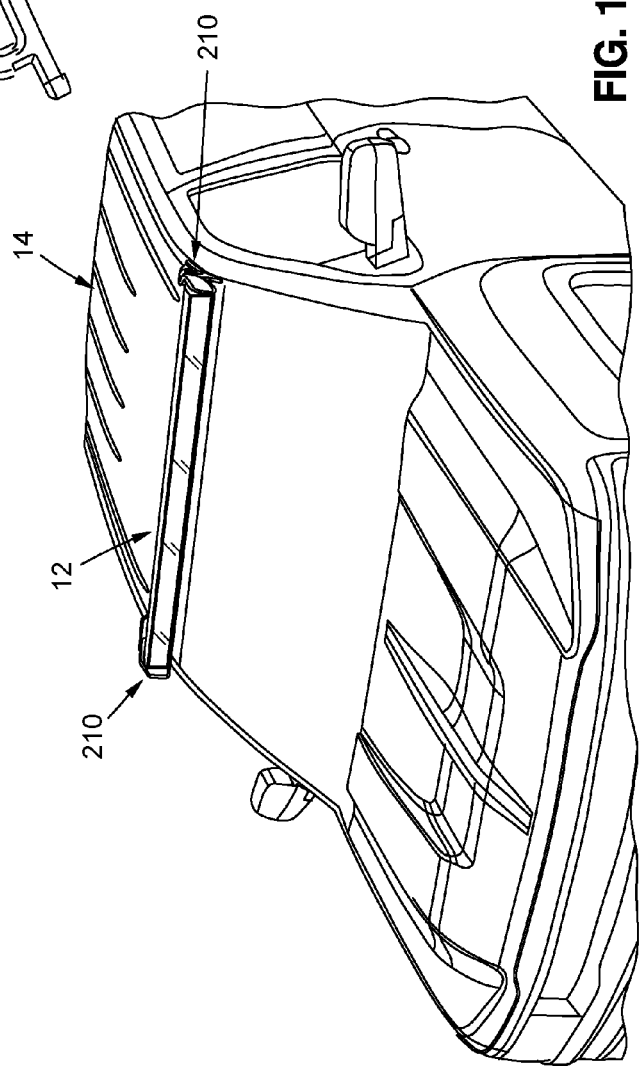

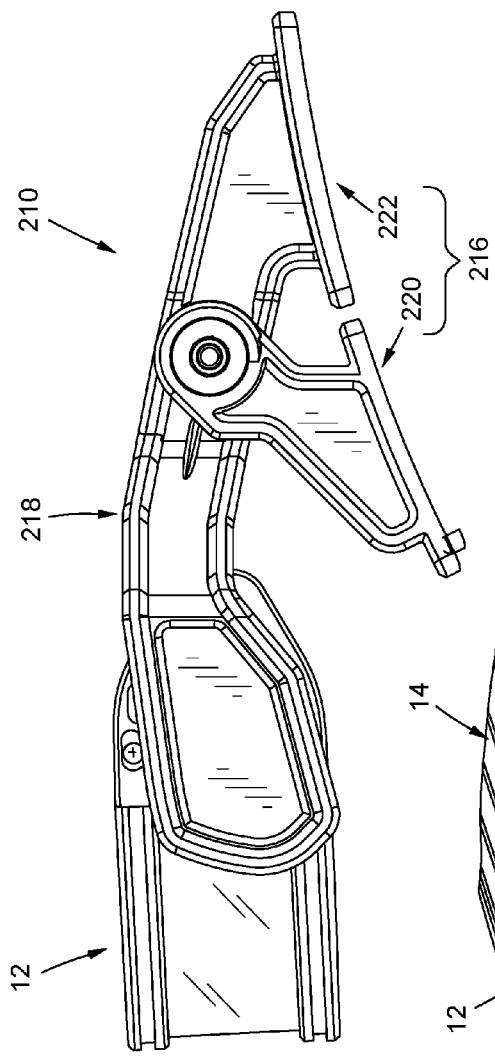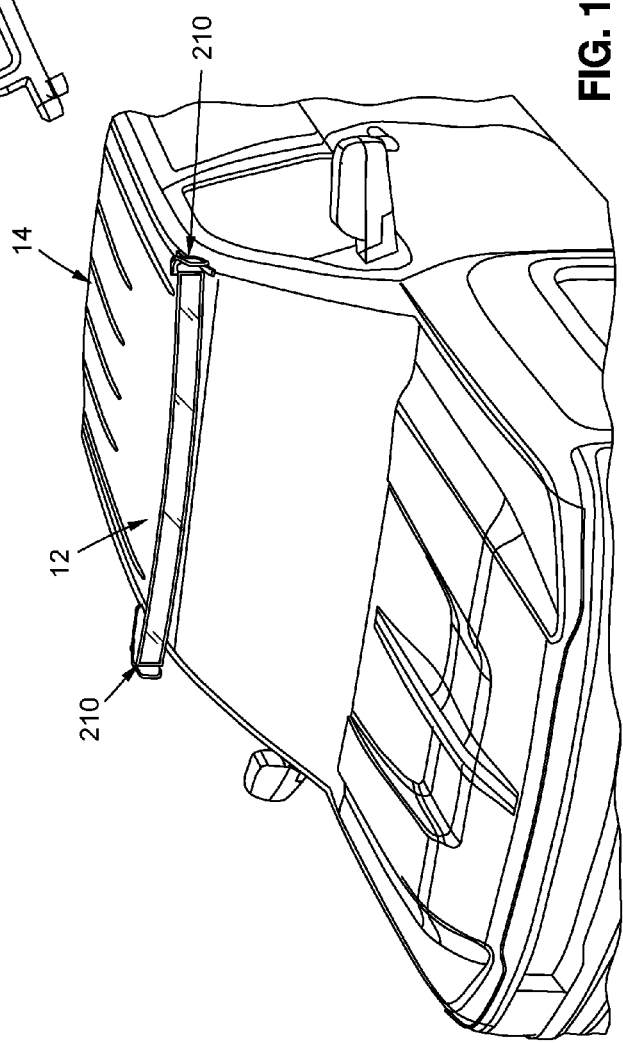

UNIVERSAL MULTI AXIS ADJUSTABLE WINDSHIELD LIGHT BAR AND MOUNTING SYSTEM

CROSS-REFERENCE TO RELATED APPLICATIONS

This application claims the benefit of U.S. Application Ser. No. 62/414,245, filed Oct. 28, 2016, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to mounting hardware for a vehicle light bar, and more specifically, to a universal mounting device adaptable for mounting different light bars on different vehicles in different mounting configurations.

2. Description of the Related Art

Certain vehicles have been equipped with light bars, which generally extend across the vehicle over the top of the windshield. The light bars are generally used to enhance the visibility at night, particularly for off-road vehicles, automobiles driven by security personnel or other vehicles traveling in poorly lit areas or driving conditions.

Conventional light bars are currently sold in variety of different sizes and shapes. For instance, standard light bars are sold in different lengths, with one version being 50-inches in length, while another version is 54-inches in length. In addition to the different lengths, the conventional light bars are also available in different shapes, including a generally linear shape and a slightly arcuate shape. The different sizes and shapes of the light bars are intended to accommodate vehicles that differ in size, such as mid-size SUVs or trucks, and full-size SUVs or trucks.

Conventional light bars are typically mounted to the vehicle with one or more mounting brackets, with the light bar being mounted in one of two widely adopted mounting configurations, namely, a roof mounting configuration or a pillar mounting configuration. In the roof mounting configuration, the mounting brackets may be connected to the roof of the vehicle in a location that is generally rearward of an upper edge of the vehicle windshield. In the pillar mounting configuration, the mounting brackets are mounted to the pillars of the vehicle, which extend along opposite sides of the vehicle windshield.

Although conventional mounting brackets are suitable for mounting light bars to the vehicle, such conventional mounting brackets suffer from several deficiencies. In particular, most conventional mounting brackets are fabricated from formed sheet metal, and are specifically configured for use in mounting a specific light bar in a particular mounting configuration on a particular vehicle. In other words, most conventional mounting brackets lack adaptability and are instead, intended for a very specific, narrow use. The specific-nature of conventional light brackets creates hardships on manufacturers of the mounting brackets and vendors of the mounting brackets, since the manufacturers and vendors may be required to manufacture and sell several different mounting brackets to accommodate the needs of different consumers. Furthermore, the consumer may experience difficulties in finding a particular mounting bracket which can accommodate a specific light bar for a particular vehicle.

Accordingly, there is a need in the art for a universal mounting device which may be used with several different light bars and vehicles for mounting the light bars on the vehicles in different mounting configurations. Various aspects of the present disclosure address this particular need, as will be discussed in more detail below.

BRIEF SUMMARY

The present disclosure generally relates to a universal, adjustable mounting device for mounting a light bar to a vehicle. The adjustable nature of the mounting device allows for mounting of the light bar at several locations on the vehicle, including widely-adopted roof mount and pillar mount locations. The mounting device is also useable with light bars that vary in size and shape, including 50 inch light bars, 54 inch light bars, as well as light bars that are curved or straight.

According to one embodiment, the adjustable mounting device includes a base mount assembly including a first base mount and a second base mount pivotally coupled to each other, with the first base mount and the second base mount each being configured to be attachable to the vehicle. A light mount is pivotally coupled to the base mount assembly and is configured to be attachable to the light bar for mounting the light bar on the vehicle.

The first base mount and the second base mount may include complimentary spherical surfaces which interface with each other. The complimentary spherical surfaces of the first base mount and the second base mount may be moveable relative to each other to effectuate movement between the first base mount and the second base mount along an arcuate path.

The base mount assembly and the light mount may have complimentary spherical surfaces which interface with each other. The complimentary spherical surfaces of the base mount assembly and the light mount may be moveable relative to each other to effectuate arcuate movement between the base mount assembly and the light mount. The base mount assembly may include a plurality of grooves arranged in a starburst pattern and the light mount may include a pair of projections that interface with a corresponding pair of the plurality of grooves to limit movement of the light mount relative to the base mount assembly.

The mounting device may further include a pair of gaskets coupled to respective ones of the first base mount and the second base mount to create a fluid tight seal between the base mount assembly and the vehicle.

The light mount may include a pair of mount openings adapted for connecting the light bar to the light mount. The light mount may include a single mount opening adapted for connecting the light bar to the light mount. The light mount may include an arcuate surface adapted for interfacing with the light bar. The light mount may be pivotable relative to both the first base mount and the second base mount.

According to another embodiment, the adjustable mounting device includes a vehicle mount assembly having a pair of vehicle mounts each being securable to the vehicle, with the pair of vehicle mounts being moveably coupled to each other to enable adjustment of the pair of the vehicle mounts to conform to a contour of the vehicle. A light mount is pivotally coupled to the vehicle mount assembly and adapted to be engageable with the light bar.

According to yet another embodiment, there is provided a mounting kit for mounting a light on a vehicle. The mounting kit includes an adjustable mounting device comprising a base mount assembly including a first base mount and a second base mount coupled to each other. The first base mount and the second base mount are each configured to be attachable to the vehicle. The adjustable mounting device further includes a rail mount pivotally coupled to the base mount assembly. A rail is connectable to the rail mount, with the rail being configured to be attachable to the light.

The rail may include at least one groove extending therein, with the groove being configured to effectuate attachment of the light to the rail.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4 is an exploded upper perspective view of a mounting device including a forward base mount, a rearward base mount, and a light mount;

FIG. 5 is an upper perspective view of the forward base mount depicted in FIG. 4;

FIG. 6 is an upper perspective view of the rearward base mount depicted in FIG. 4;

FIG. 7 is a top view of the mounting device;

FIG. 8 is a side view of the mounting device;

FIG. 9 is a partial cross sectional view showing an interconnection between the forward base mount, the rearward base mount, and the light mount;

FIG. 11 is a partially exploded, upper perspective view of a mounting kit for mounting a light on a vehicle;

FIG. 12 is a cross sectional view taken through a rail of the mounting kit depicted in FIG. 11;

FIG. 16 is a side view of the mounting device of FIG. 13 attached to a first light bar;

FIG. 16A is an upper perspective view depicting the mounting device and light bar of FIG. 16 mounted on a vehicle;

FIG. 17 is a side view of the mounting device of FIG. 13 attached to a second light bar;

FIG. 17A is an upper perspective view depicting the mounting device and light bar of FIG. 17 mounted on a vehicle;

FIG. 18 is a side view of the mounting device of FIG. 13 attached to a third light bar; and FIG. 18A is an upper perspective view depicting the mounting device and light bar of FIG. 18 mounted on a vehicle.

Common reference numerals are used throughout the drawings and the detailed description to indicate the same elements.

DETAILED DESCRIPTION

Figure 1:
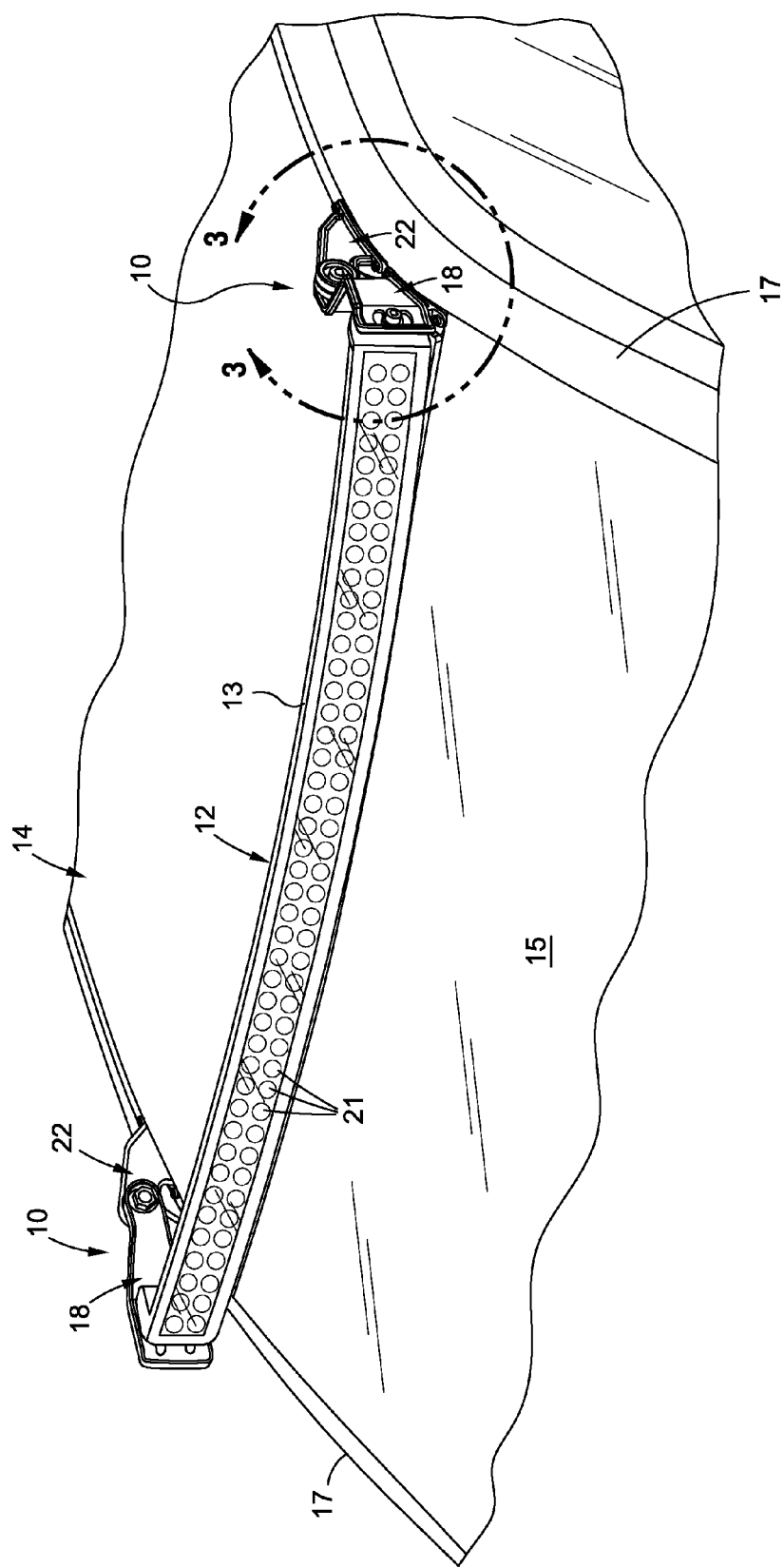
FIG. 1 is an upper perspective view of a light bar mounting system including a pair of mounting devices used to mount a light bar on a vehicle.

The detailed description set forth below in connection with the appended drawings is intended as a description of certain embodiments of a mounting device for mounting a light or light bar to a vehicle and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present disclosure, and are not for purposes of limiting the same, there is depicted a mounting system including a pair of adjustable mounting devices 10 for mounting a light bar 12 on a vehicle 14. Conventional light bars 12 include a light bar body 13 having a plurality of lights 21 (e.g., light emitting diodes) coupled thereto to illuminate an area adjacent to the vehicle 14. The mounting device 10 is specifically configured and adapted to accommodate different light bars 12, such as curved light bars, straight light bars, and light bars that are of differing lengths, such as standard 50-inch light bars for mid-size vehicles, as well as standard 54-inch light bars for full size vehicles. The mounting device 10 is also adaptable to allow for a roof mount configuration or a pillar mount configuration on the vehicle 14. In this regard, the universal mounting device 10 is an improvement over conventional mounting brackets, which are typically designed for use with a particular light bar, on a particular vehicle, for a particular mounting configuration. As such, the universal nature of the mounting device 10 provides advantages to the end user, since the mounting device 10 may be used on different vehicles and with different light bars. Advantages are also realized by retailers, as they can stock a single type of mounting device for sale to a wide range of customers, rather than having to stock separate mounting brackets to appeal to different consumer demands. Furthermore, the universal nature of the mounting device also simplifies manufacturing, as a single type of mounting device may be more widely adopted by consumers.

FIG. 1 is an upper perspective view of light bar 12 mounted on vehicle 14 via a pair of mounting devices 10, with the mounting devices 10 being mounted on opposing sides of the vehicle 14 in a roof mount configuration, i.e., rearward of the windshield 15. Although the exemplary embodiment depicted in FIG. 1 shows the pair of mounting devices 10 in the roof mount configuration, it is understood that the mounting devices 10 may also be mounted in a pillar mount configuration, wherein the mounting devices 10 are coupled to respective pillars 17 extending along the sides of the windshield 15. The mounting devices 10 are configured to allow for mounting of the light bar 12 on the vehicle 14 such that the light bar 12 extends across the vehicle 14 and is suspended over the windshield 15. The mounting devices 10 may be configured to allow the light bar 12 to be positioned slightly forward of the uppermost edge of the windshield 15, as is shown in FIG. 1, or alternatively, to be located directly above the uppermost edge 19 (see FIG. 2) of the windshield 15, or slightly rearward of the uppermost edge 19 of the windshield 15. The position of the light bar 12 relative to the windshield 15 may depend on the configuration of the vehicle 14, the configuration of the light bar 12, and/or the user's desired location of the light bar 12 relative to the windshield 15. In the embodiment depicted in FIG. 1, the light bar 12 and corresponding light 21 are in a forward-facing direction to illuminate an area in front of the vehicle 14, although it is understood that the direction of the light emitted by the light bar 12 is not limited thereto.

Figure 2:
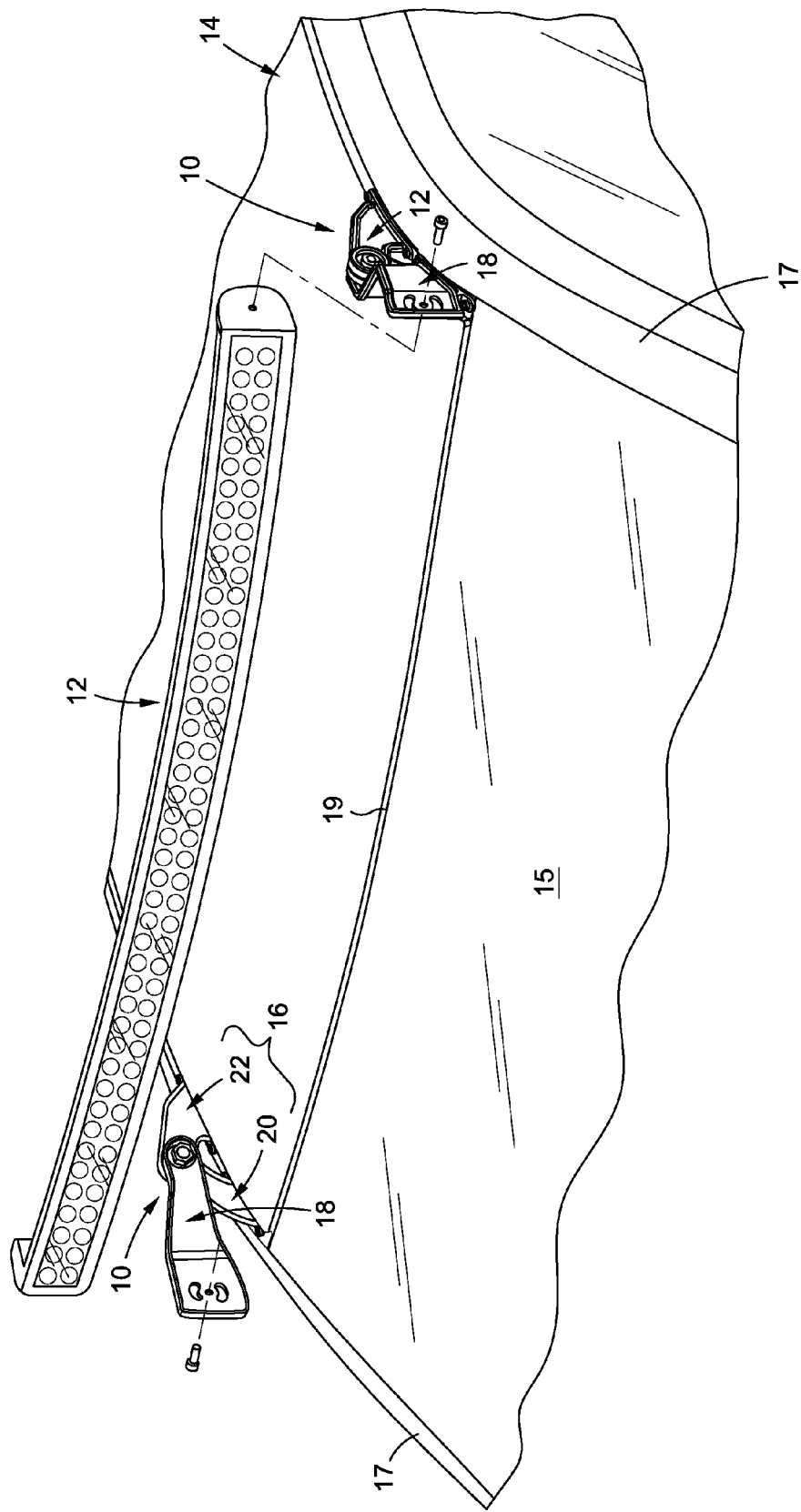
FIG. 2 is an upper perspective view of the light bar mounting system depicted in FIG. 1, with the light bar being exploded from the pair of mounting devices.
Figure 3:
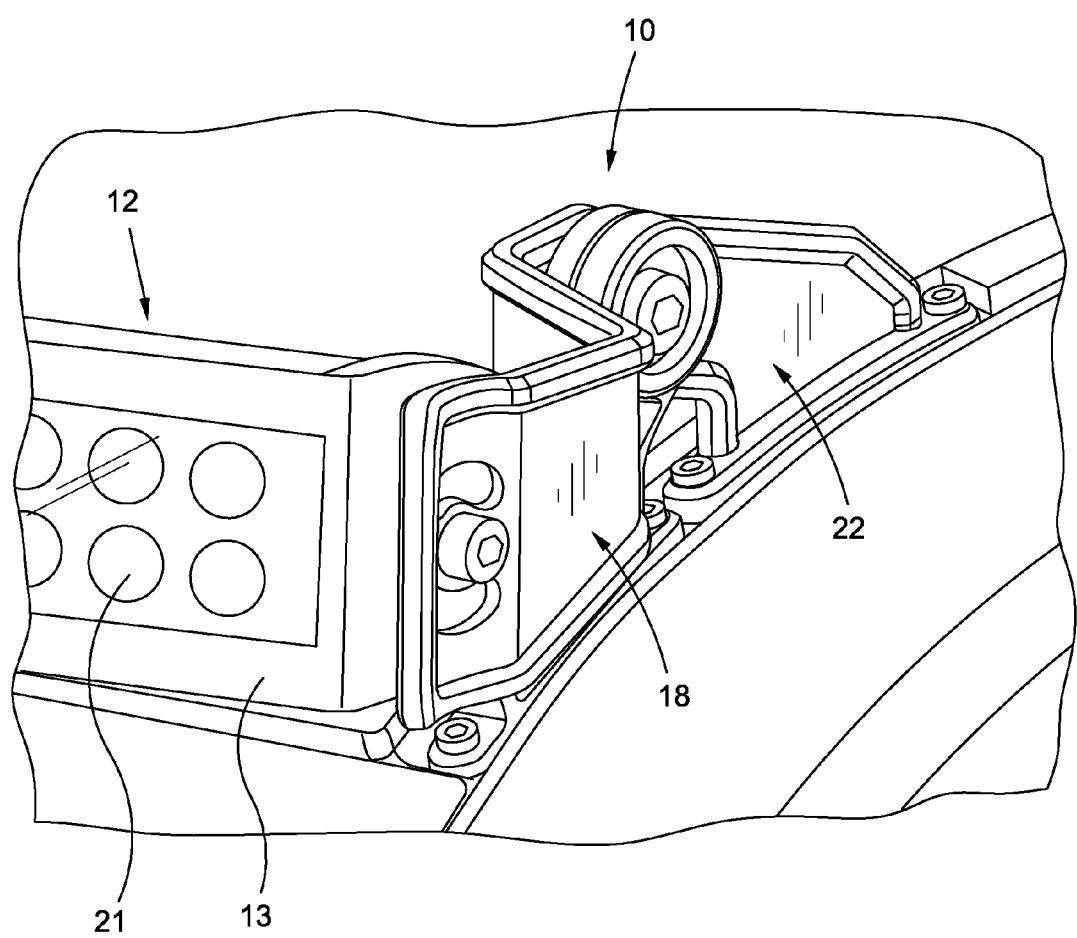
FIG. 3 is an enlarged upper perspective view of one of the pair of mounting devices connected to the light bar.

In FIG. 2, the light bar 12 is shown as being detached from the mounting devices 10, while FIG. 3 is an enlarged perspective view showing the engagement between the light bar 12 and the mounting devices 10. The particular light bar 12 depicted in FIGS. 1-3 is configured as a "single-stud" mount, with only one stud or bolt being used to connect each mounting device 10 to the light bar 12. However, the mounting devices 10 are also adapted to accommodate light bars 12 that are adapted for "double-stud" mount, as will be described in more detail below.

According to one embodiment, each adjustable mounting device 10 includes a base mount assembly 16, i.e., a vehicle mounting assembly, that is attachable to the vehicle 14, and a light mount 18, i.e., a rail mount, pivotally coupled to the base mount assembly 16. The base mount assembly 16 includes a first base mount 20 and a second base mount 22 (i.e., a pair of vehicle mounts) pivotally coupled to each other, with the first base mount 20 and the second base mount 22 each being configured to be attachable to the vehicle 14. The first and second base mounts 20, 22 are moveably coupled to each other to enable adjustment of the pair of the base mounts 20, 22, which allows the bottom of the base mounts 20, 22 to conform to a particular contour or shape of a mounting surface of the vehicle 14.

FIG. 4 is an exploded, upper perspective view of mounting device 10, while FIG. 5 is a perspective view of the first base mount 20, and FIG. 6 is a perspective view of the second base mount 22. FIG. 7 is an assembled, top view of the mounting device 10, while FIG. 8 is an assembled, side view of the mounting device 10. Each component of the mounting device 10 will now be described in more detail below.

The first base mount 20 includes an elongate foot portion 24, a main body portion 26, and a head portion 28. The elongate foot portion 24 includes a lower surface or edge 30, which may define a slightly arcuate shape. According to one embodiment, the foot portion 24 extends beyond the main body portion 26 in two opposite directions, so as to define a pair of foot extensions 32. Each foot extension 32 includes an aperture extending therethrough, with each aperture being sized and configured to receive a respective bolt, rivet, screw or similar mechanical fastener for securing the first base mount 20 to the vehicle 14, as will be described in more detail below.

The main body portion 26 extends between the foot portion 24 and the head portion 28 and supports the head portion 28 in spaced relation to the foot portion 24. The main body portion 26 defines a width as that distance between two opposing sides of the main body portion 26. According to one embodiment, at least one section of the main body portion 26 has a width that decreases in a direction from the foot portion 24 to the head portion 28.

The head portion 28 is spaced above the foot portion 24, and is offset from a longitudinal center of the foot portion 24, such that the center of the head portion 28 is disposed closer to one of the foot extensions 32 than the other. Indeed, as can be seen in FIG. 8, the center of the head portion 28 may be positioned directly above, or slightly rearward of the underlying foot extension 32. One side of the head portion 28 defines a convex, partially spherical surface 34, the importance of which will be described in more detail below. The opposite side of the head portion 28 defines an outer rim 36 extending around a central recess 38. The head portion 28 also includes a central aperture 40, in communication with the central recess, co-axial with the outer rim 36 and extending through the partially spherical surface 34.

The second base mount 22 is similar to the first base mount 20, in that the second base mount 22 also includes an elongate foot portion 42, a main body portion 44, and a head portion 46. The elongate foot portion 42 and the main body 44 are similar to those corresponding structures on the first base mount 20. In particular, the foot portion 42 may include a slightly arcuate lower edge or surface 48, along with a pair of foot extensions 50 located on opposite sides of the main body portion 44. Furthermore, the main body portion 44 may include a section having a tapered width in a direction extending from the foot portion 42 to the head portion 46. It is understood that although the main body portion 44 of the second base mount 22 may have a similar configuration to the main body portion 26 of the first base mount 20, such configurations are not required to be identical.

The head portion 46 of the second base mount 22 is spaced above the foot portion 42, and is offset from the longitudinal center of the foot portion 42, such that the center of the head portion 46 is disposed closer to one of the foot extensions 50 than the other. Indeed, as can be seen in FIG. 8, the center of the head portion 46 may be positioned directly above, or slightly forward of the underlying foot extension 50. One side of the head portion 46 defines a convex, partially spherical surface 52 having a plurality of grooves 54 formed therein and forming a starburst pattern, the importance of which will be described in more detail below. The opposite side of the head portion 46 defines an outer rim 56 extending around a central recess 58. The outer rim 56 defines a convex, partially spherical configuration that is complimentary to the concave, partially spherical surface 34 of the first base mount 20. The head portion 46 also includes a central aperture 60, co-axial with the outer rim 56 and extending through the partially spherical surface 52 and central to the grooves 54 forming the starburst pattern, such that the grooves 54 forming the starburst pattern emanate radially outward of the central aperture 60.

The light mount 18 includes a circular first end portion 62, a second end portion 64, and a main body portion 66 extending between the first and second end portions 62, 64. The first end portion 62 is connectable to the second body mount 22 and includes a concave, partially spherical surface 68 which interfaces with the partially spherical surface 52 of the second body mount 22. The outer diameter of the partially spherical surfaces 34, 52, 68 of the first body mount 20, the second body mount 22, and the light mount 18 are substantially equal. The light mount 18 additionally includes a pair of nubs 70 or protrusions extending outwardly from the partially spherical surface 68. As will be described in more detail below, the protrusions 70 are configured to interface with a co-linear pair of grooves 54 formed on the second body mount 22, for purposes which will be explained in more detail below.

The light mount 18 further includes an elongate slot 72 formed in the first end portion 62 and located between the pair of protrusions 70. The elongate slot 72 is aligned with the apertures 40, 60 of the first and second body mounts 20, 22 to connect the light mount 18 with the first and second body mounts 20, 22. FIG. 9 is a partial, cross-sectional view depicting alignment of the slot 72 with the apertures 40, 60, along with a mechanical fastener 74 (e.g., bolt) extending through the slot 72 and apertures 40, 60 to connect the light mount 18 to the first and second body mounts 20, 22.

The main body portion 66 of the light mount 18 includes a tapered configuration which increases in a direction extending from the first end portion 62 to the second end portion 64. The main body portion 66 is also angled relative to the first and second end portions 62, 64, such that the first and second end portions 62, 64 reside in offset planes. In particular, the first end portion 62 resides on a first side of the base mount assembly 16, while the second end 64 portion resides on an opposing second side of the base mount assembly 16.

The second end portion 64 includes an arcuate configuration defining an apex. The arcuate configuration is intended to allow for adaptation of the mounting device 10 to the size and configuration of the light bar 12. The mounting device 10 is configured such that when a pair of mounting devices 10 are attached on opposing sides of the vehicle 14, the apexes of the respective second end portions 64 extend toward each other. The second end portion 64 further includes a central aperture 76 extending therethrough, along with a pair of opposing arcuate apertures 78 located on opposite sides of the central aperture 76. The central aperture 76 is used for "single stud" mounting of a light bar 12 to the mounting device 10, while the pair of opposing arcuate apertures 78 are used for "double stud" mounting of a light bar 12 to the mounting device 10.

According to one embodiment, the first base mount 20, second base mount 22, and light mount 18 are fabricated from cast aluminum, which offers increased strength over conventional formed sheet metal. However, it is understood that the material from which the first base mount 20, second base mount 22, and light mount 18 are fabricated is not limited to cast aluminum. Along these lines, any material known in the art may be used without departing from the sprit and scope of the present disclosure.

The first base mount 20, second base mount 22, and light mount 18 are configured to be moveable relative to each other to enhance the adaptability and functionality of the mounting device 10. In particular, the first base mount 20, second base mount 22, and light mount 18 are pivotable relative to each other about a common pivot axis 80. The pivotal movement between the first and second base mounts 20, 22 allows a user to vary the distance between the foot portions 24, 42 of the first and second base mounts 20, 22 so as to conform the foot portions 24, 42 to the contour of the vehicle 14. In this regard, it is understood that the vehicle 14 may define an arcuate contour, and by pivoting the first and second base mounts 20, 22 relative to each other, a user may bring the lower edges 30, 48 of the foot portions 24, 42 into alignment with the vehicle contour. During relative pivotal movement between the first and second base mounts 20, 22, the convex partially spherical surface 34 of the first base mount 20 interfaces with the corresponding concave partially spherical rim 56 of the second base mount 22, and in particular, the convex partially spherical surface 34 moves relative to the concave partially spherical rim 56 to effectuate movement between the first base mount 20 and the second base mount 22 along an arcuate path represented by arrows 82, 84.

The pivotal movement about the common pivot axis 80 between the base mount assembly 16 and the light mount 18, and more specifically, between the second base mount 22 and the light mount 18 allows a user to move the light mount 18 in an arcuate path represented by arrow 85 to change the angle at which the light mount 18 extends from the base mount assembly 16. In particular, the position of the light bar 12 relative to the vehicle 14 can be raised by pivoting the light mount 18 relative to the base mount assembly 16 in a first pivot direction, while the position of the light bar 12 can be lowered by pivoting the light mount 18 relative to the base mount assembly 16 in an opposing second pivot direction. The complimentary nature of the partially spherical surfaces 52, 68 of the second base mount 22 and the light mount 18 allows for the pivotal movement about the pivot axis 80.

The pivotal movement of the light mount 18 relative to the second base mount 22 is not limited to that pivotal movement about the common pivot axis 80. Rather, the elongate nature of the slot 72 also allows the light mount 18 to glide over the partially spherical surface 52 of the second base mount 22 along an axis defied by the elongate slot 72. According to one embodiment, such movement may allow for approximately 10-20 degrees of movement of the light mount 18 relative to the second base mount 22 along the axis defined by the elongate slot 72. An example of such movement is represented by arrow 87 in FIG. 7. Furthermore, such movement would also be guided by the interaction between the pair of projections 70 formed on the light mount 18 and a corresponding pair of axially aligned grooves 54 on the second base mount 22. Thus, the user may initially pivot the light mount 18 relative to the second base mount 22 about the common pivot axis 80 until the light mount is in the preferred inclination, with the pair of projections 70 on the light mount 18 being aligned with a pair of grooves 54 on the second body mount 22. Subsequently, the light mount 18 may be moved relative to the second base mount 22, with the projections 70 translating within the grooves 54 until the light mount 18 is in the desired location. Movement of the projections 70 within the grooves 54 allows the second end portion 64 of the light mount 18 to be moved inward (i.e., toward a longitudinal centerline of the vehicle 14) or outward (away from the longitudinal centerline of the vehicle 14) to properly position the light mount 18 for mounting of the light bar 12 thereto. Once the light mount 18 is in the preferred position, the fastener 74 (e.g., nut and bolt) may be tightened to substantially fix the position of the light mount 18, first base mount 20 and second base mount 22 relative to each other.

As noted above, the mounting device 10 is adapted to be mounted onto the vehicle 14 in at least two different mounting configurations, including a pillar mount configuration and a rear roof mount configuration. It is understood that the contour of the vehicle 14 may differ at the various locations associated with the roof mount and pillar mount configurations, and thus, such pivotal movement of the first and second base mounts 20, 22 accommodates such adaptability in terms of different mounting configurations.

Figure 10:
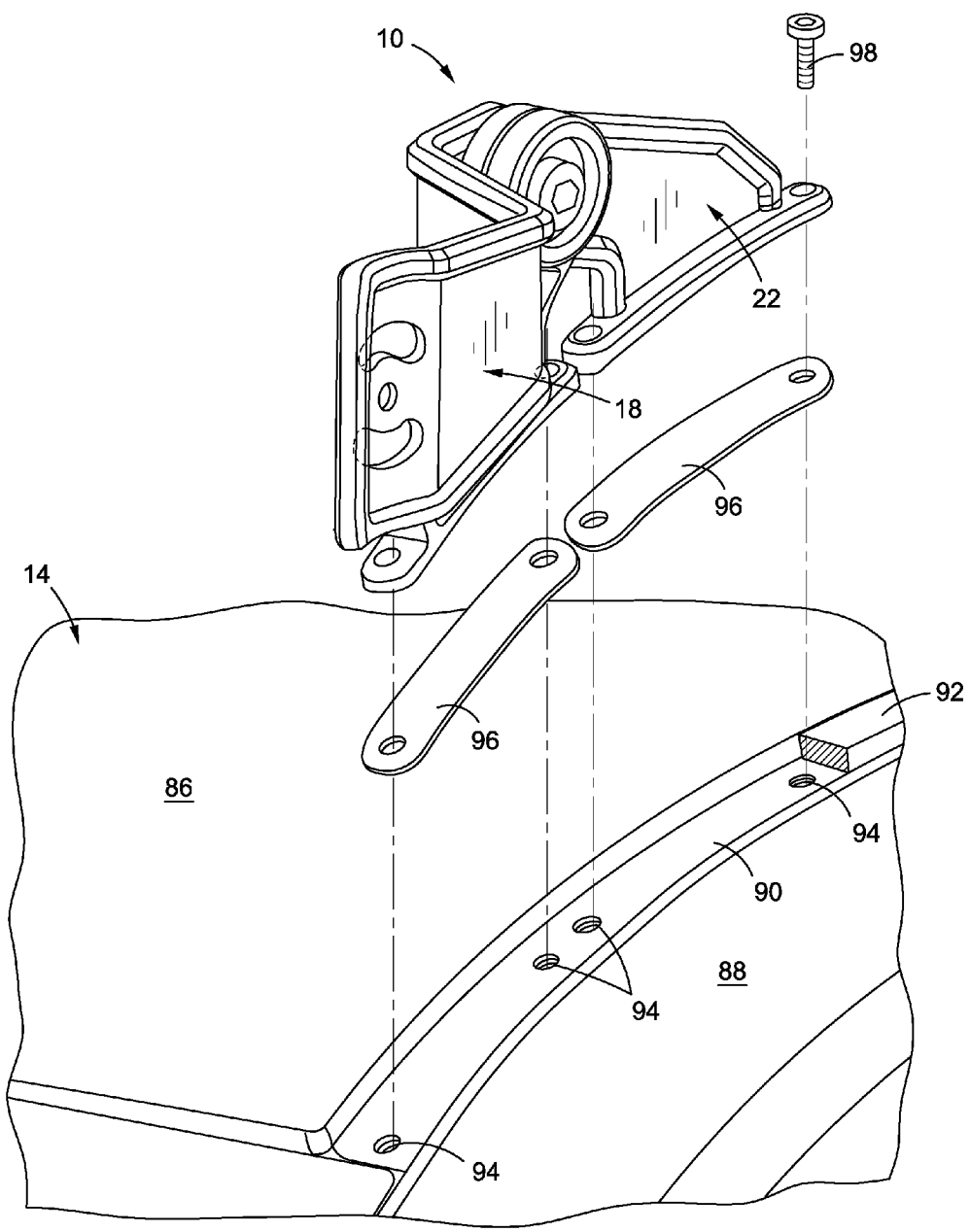
FIG. 10 is an upper perspective view of the mounting device exploded from a vehicle.
Figure 13:
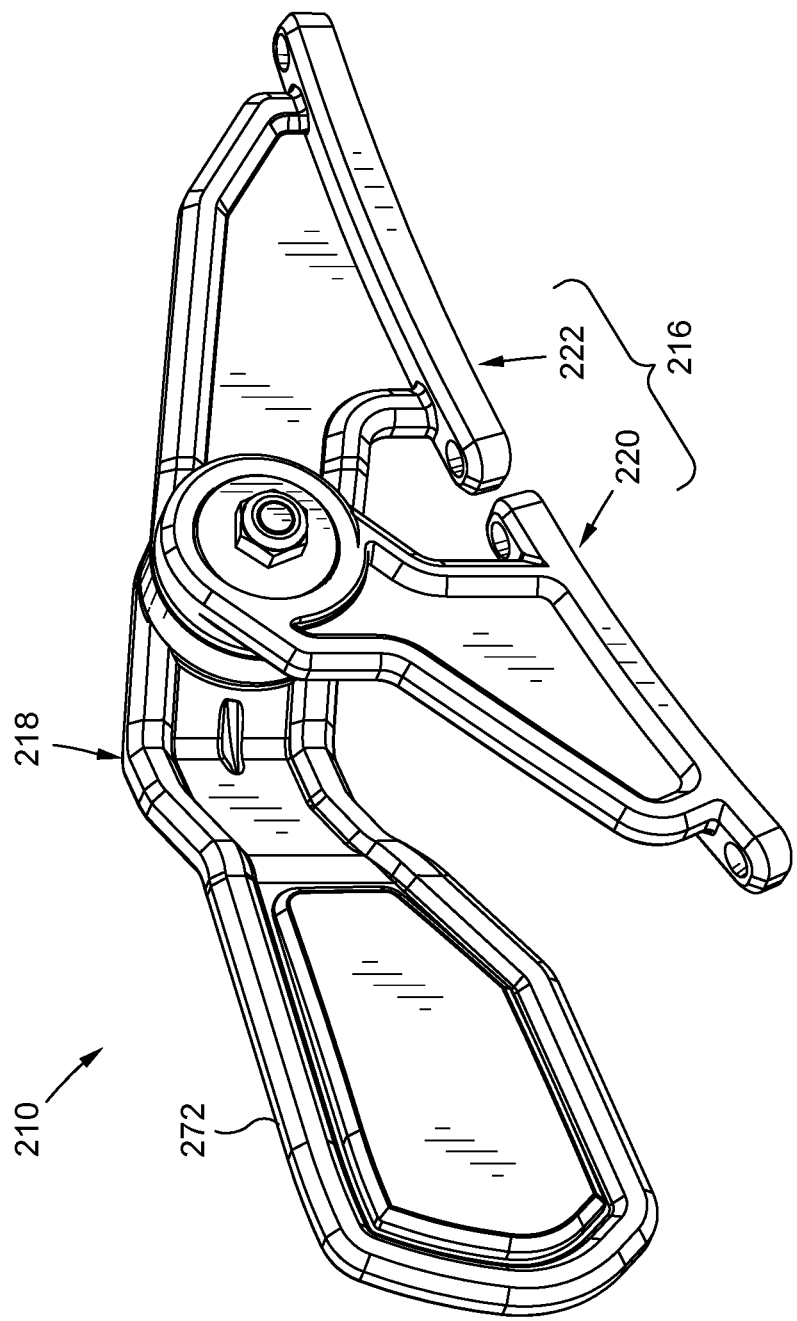
FIG. 13 is an upper perspective view of a second embodiment of a mounting device used for mounting a light bar to a vehicle.
Figure 14:
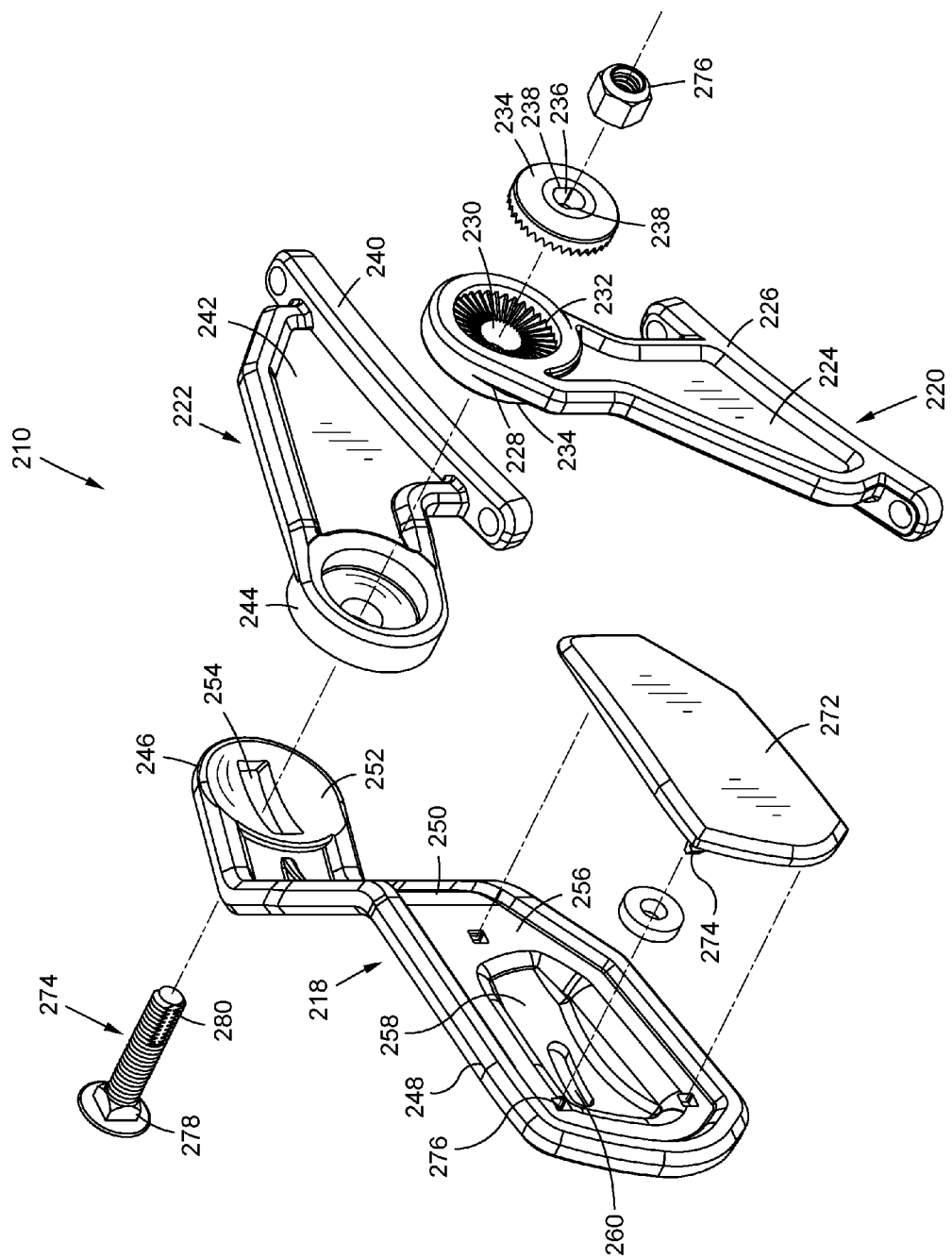
FIG. 14 is an exploded upper perspective view of the mounting device depicted in FIG. 13.

Referring now specifically to FIG. 10, the mounting device 10 is shown exploded from the vehicle 14 to more specifically illustrate particulars related to the attachment of the mounting device 10 to the vehicle 14. Those skilled in the art will appreciate that most vehicles 14 include a roof panel 86 that is joined with a side body panel 88 via a pinch weld to form a rain gutter 90. The rain gutter 90 is typically filled with a plastic insert 92 to cover the pinch weld. According to one embodiment, the mounting device 10 is connected to the vehicle 14 at the pinch weld. In this regard, prior to securing the mounting device 10 to the vehicle 14, that portion of the plastic insert 92 covering the region of the pinch weld to which the mounting device 10 is to be connected is cut and removed. Two pairs of threaded holes 94 are formed in the pinch weld, which correspond to the two pairs of holes formed in the base mount assembly 16. A pair of gaskets 96 may be positioned between respective ones of the first and second base mounts 20, 22 and the surface of the vehicle 14 to which the mounting device 10 is attached to form a fluid tight seal between the base mount assembly 16 and the vehicle 14. Each gasket 96 may define a shape corresponding to the lower surface of the corresponding one of the first and second base mounts 20, 22, and may have a pair of apertures which are aligned with the pair of apertures in the corresponding base mounts 20, 22, as well as a corresponding pair of apertures 94 in the vehicle 14. A fastener 98, e.g., screw, rivet, bolt, or the like, is advanced through each set of aligned apertures to secure the first and second base mounts 20, 22 to the vehicle 14.

Referring now specifically to FIGS. 11 and 12, it is understood that the mounting devices 10 are not only adapted for use with a light bar 12 having built-in lights, but that the mounting devices 10 may also be used with a rail 100 adapted to be selectively connectable to a light 102. It is contemplated that the mounting devices 10, the rail 100, and/or the lights 102 may be included as a kit. The rail 100 may be configurable to position a desired number of lights 102 at desired locations along the rail 100. As such, the rail 100 offers enhanced adaptability over conventional light bars 12. The rail 100 depicted in FIGS. 11 and 12 includes four outer surfaces 102, 104, 106, 108 with a groove 110 extending into the rail 100 from each outer surface 102, 104, 106, 108. Each groove 110 extends longitudinally across the entirety of the rail 100 between a pair of opposed end surfaces 110 and is adapted to receive a light 102, which includes an insert 112 complimentary in shape to the groove 110. In the exemplary embodiment, the insert 112 and groove 110 define complimentary dove tail configurations, although the shape of the insert 112 and groove 110 may be varied. The groove 110 and insert 112 are adapted to allow the light 102 to slide along the groove 110 to allow for selective placement of the light 102 relative to the rail 100. Furthermore, the insert 112 may be selectively placed in any one of the grooves 110 formed on the rail 100. As such, the lights 100 may be positioned above the rail 100, below the rail 100, in front of the rail 100, or behind the rail 100. The rail 100 also includes a pair of apertures extending into the rail 100 from the opposed end surfaces 110 to allow for attachment of the rail 100 to the mounting devices 10. In this regard, the exemplary embodiment is configured for single stud attachment to a corresponding mounting device 10, although it is understood that the rail 100 may alternatively be configured for double stud attachment to the mounting device 10.

Referring now to FIGS. 13-18, there is depicted a second embodiment of a universal mounting device 210 for mounting a light bar 12 on a vehicle 14. The mounting device depicted in FIGS. 13-18 shares similarities with the mounting device 10 depicted in FIGS. 1-11, and thus, the following discussion will focus on the unique features of the mounting device 210.

The mounting device 210 generally includes a base mount assembly 216 and a light mount 218, with the base mount assembly 216 including a first base mount 220 and a second base mount 222. The first base mount 220, second base mount 222, and light mount 218 are configured to be pivotable relative to each other to allow for adjustment of the mounting device 210 to interface with different light bars 12, different vehicles 14, or to assume different mounting configurations, as discussed in more detail above. The first base mount 220 includes a foot portion 224, a main body portion 226, and a head portion 228. The head portion 228 of the first base mount 220 differs from the head portion 28 of the first base mount 20 discussed above. In particular, the head portion 228 includes a central aperture 230 which extends between a first side surface 232 and a second side surface 234. The first side surface 232 is configured to be jagged or serrated, with series of ridges and intervening valleys extending radially outward from the central aperture 230. The second side surface 234 is a convex, partial spherical surface, similar to the first base mount 20 described above.

The first side surface 232 is adapted to interface with a serrated anti-rotation washer 234, which includes a jagged or serrated surface complimentary in shape to the first side surface 232. The anti-rotation washer 234 additionally includes a central aperture 236, which includes a pair of opposed linear sections 238, the importance of which will be described in more detail below.

The second base mount 222 is similar to the second base mount 22 described above, with the second base mount 222 including a foot portion 240, a main body portion 242, and a head portion 244. The primary distinction between the second base mount 222 shown in FIGS. 13-18 and the second base mount 22 described above is that head portion 244 of the second base mount 222 in FIGS. 13-18 does not include a plurality of grooves forming a starburst pattern. Rather, the convex surface of the head portion 244 is generally smooth.

The light mount 218 includes a first end portion 246, a second end portion 248 and a main body portion 250. The first end portion 246 includes a first concave surface 252, an opposing second convex surface, and a slot extending 254 between the first concave surface 252 and the opposing second convex surface. The slot 254 extends in a diametrical direction with the exemplary embodiment defining a generally quadrangular configuration. The importance of the slot 254 will be described in more detail below.

Figure 15:
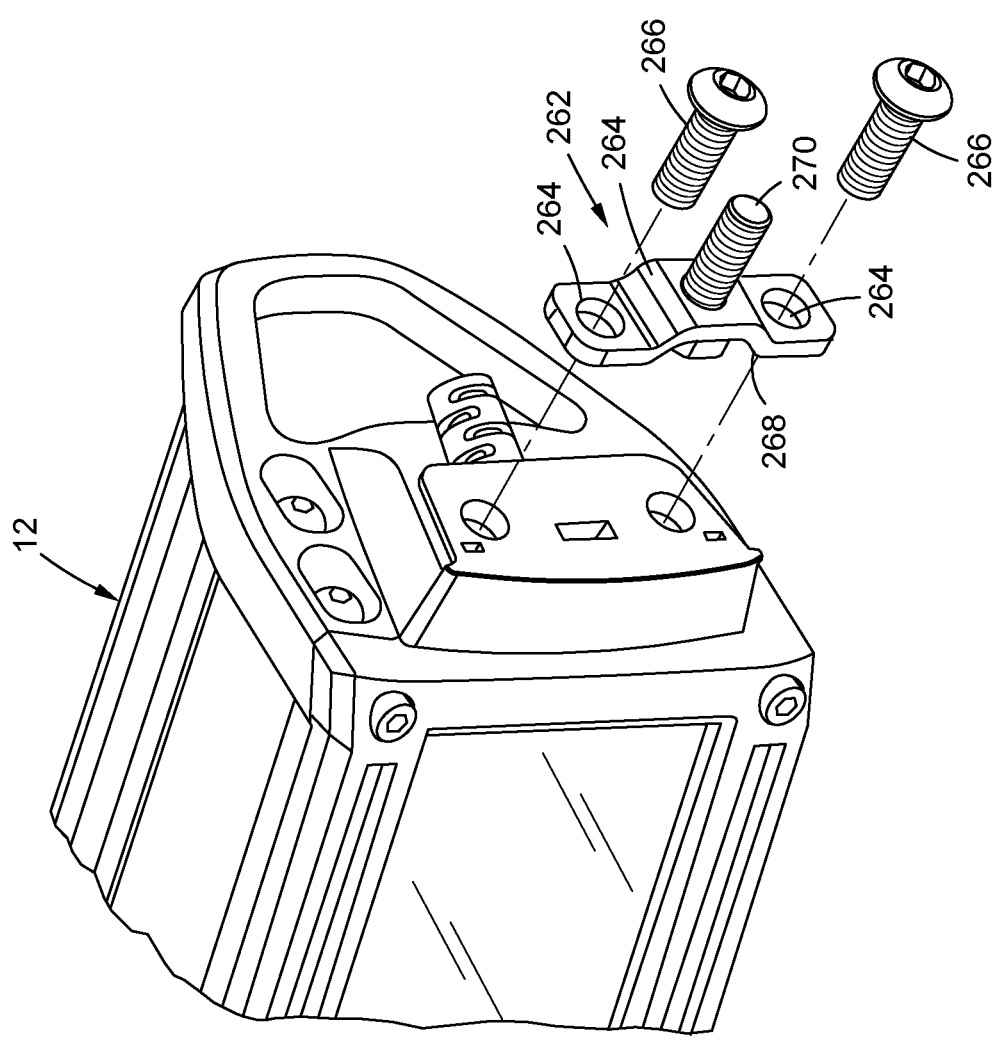
FIG. 15 is an exploded upper perspective view of an adapter used to interface a double-stud light bar with the second embodiment of the mounting device.

The second end portion 248 includes a first surface 256 and an opposing second surface, with the second surface having a convex region defining an apex. A cavity is formed in the second end portion, and extends toward a base surface 258, which is recessed from the first surface 256. A slot 260 is formed in the second end portion 248, with the slot 260 being used for connecting the light bar 12 to the light mount 218. Notably, the light mount 218 only includes a single slot, whereas the light mount 18 discussed above included three slots or openings, to accommodate both single stud mount and double stud mount light bars 12. Since only a single slot 260 is incorporated into the light mount 218, an adapter may be used to interface a double stud mount light bar with the light mount 218. FIG. 15 shows an exemplary embodiment of an adapter 262 for interfacing a double stud mount light bar 12 with the light mount 218. In particular, the adapter 262 includes an adapter body 264 having a pair of lateral openings 264, each of which are adapted to receive a respective bolt 266. The bolts 266 are insertable into respective openings formed on the double stud mount light bar 12. The adapter 262 additionally includes a central opening 268 adapted to receive a central mounting bolt 270, which is insertable into the slot 260 formed on the light bar 12.

A cover 272 is attachable to the light mount 218 to extend over the cavity formed at the second end portion 248 and cover mounting hardware used to connect the light bar 12 to the light mount 218. The cover 272 may include one or more attachment posts 274 that snap into one or more corresponding holes 276 or recesses formed on the light mount 218. The cover 272 may include a logo or other indicia formed thereon. It is also contemplated that the cover 272 may be formed of a thermoplastic material, or other materials known by those skilled in the art.

The light mount 218 is connected to the base mount assembly 216 via a bolt 274 and nut 276. The bolt 74 has a square neck portion 278, and a distal end portion having a pair of opposed flat sections 280. The distal end portion is advanced through the light mount slot 254, the apertures in the first and second base mounts, as well as through the aperture in the anti-rotation washer 234. When the bolt 274 is completely advanced through the slot 254 and apertures, the square neck portion 278 is aligned with, and extends into the slot 254 of the light mount 218, and the opposed flat sections 280 of the distal end portion are aligned with the opposed flat sections 238 of the aperture 236 formed in the anti-rotation washer 234. The nut 276 is then screwed onto the bolt 274 to secure the assembly in place.

The unique configuration of the bolt 274, the slot 254 and the anti-rotation washer aperture 236 prevents rotation of the light mount 218 relative to the base mount assembly 216 about an axis extending through the apertures and slot 254. However, due to the elongate nature of the slot 254, the light mount 218 may glide over the second surface of the head portion 244 of the second base mount 22 to allow for adjustment to accommodate various light bar widths. Furthermore, the complimentary serrations on the first base mount 220 and anti-rotation washer 220 allows for incremental pivotal adjustment of the mounting device 210. According to one embodiment, the increments may be ten degree increments, although the magnitude of the increments may vary.

FIGS. 16-18 depict several exemplary uses of the mounting device 210 with different light bars 12. In particular, FIGS. 16 and 16A show a generally straight light bar 12 that is approximately 50 inches in length. FIGS. 17 and 17A depict another generally straight 50 inch light bar 12 that differs from that shown in FIGS. 16 and 16A. FIGS. 18 and 18A show an arcuate light bar 12 that is approximately 54 inches in length. As can be seen, the mounting device 210 may be used with several different light bars 12 that are of different sizes and configurations.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An adjustable mounting device for mounting a light bar to a vehicle, the mounting device comprising:
   a base mount assembly including a first base mount and a second base mount pivotally coupled to each other, the first base mount and the second base mount each being configured to be attachable to the vehicle;
   a light mount pivotally coupled to the base mount assembly and configured to be attachable to the light bar for mounting the light bar on the vehicle;
   wherein the first base mount and the second base mount include complimentary spherical surfaces which interface with each other; and
   wherein the complimentary spherical surfaces of the first base mount and the second base mount are moveable relative to each other to effectuate movement between the first base mount and the second base mount along an arcuate path.

2. The mounting device recited in claim 1, wherein the base mount assembly and the light mount have complimentary spherical surfaces which interface with each other.

3. The mounting device recited in claim 2, wherein the complimentary spherical surfaces of the base mount assembly and the light mount are moveable relative to each other to effectuate arcuate movement between the base mount assembly and the light mount.

4. The mounting device recited in claim 3, wherein the base mount assembly includes a plurality of grooves arranged in a starburst pattern and the light mount includes a pair of projections that interface with a corresponding pair of the plurality of grooves to limit movement of the light mount relative to the base mount assembly.

5. The mounting device recited in claim 1, further comprising a pair of gaskets coupled to respective ones of the first base mount and the second base mount to create a fluid tight seal between the base mount assembly and the vehicle.

6. The mounting device recited in claim 1, wherein the light mount includes a pair of mount openings adapted for connecting the light bar to the light mount.

7. The mounting device recited in claim 1, wherein the light mount includes a single mount opening adapted for connecting the light bar to the light mount.

8. The mounting device recited in claim 1, wherein the light mount includes an arcuate surface adapted for interfacing with the light bar.

9. The mounting device recited in claim 1, wherein the light mount is pivotable relative to both the first base mount and the second base mount.

10. An adjustable mounting device for mounting a light bar to a vehicle, the mounting device comprising:
    a vehicle mount assembly having a pair of vehicle mounts each being securable to the vehicle, the pair of vehicle mounts being moveably coupled to each other to enable adjustment of the pair of the vehicle mounts to conform to a contour of the vehicle; and
    a light mount pivotally coupled to the vehicle mount assembly and adapted to be engageable with the light bar.

11. The mounting device recited in claim 10, wherein the pair of vehicle mounts include complimentary spherical surfaces which interface with each other.

12. The mounting device recited in claim 11, wherein the complimentary spherical surfaces of the pair of vehicle mounts are moveable relative to each other to effectuate movement therebetween along an arcuate path.

13. The mounting device recited in claim 10, wherein the vehicle mount assembly and the light mount have complimentary spherical surfaces which interface with each other.

14. The mounting device recited in claim 13, wherein the complimentary spherical surfaces of the vehicle mount assembly and the light mount are moveable relative to each other to effectuate arcuate movement between the vehicle mount assembly and the light mount.

15. The mounting device recited in claim 14, wherein the vehicle mount assembly includes a plurality of grooves arranged in a starburst pattern and the light mount includes a pair of projections that interface with a corresponding pair of the plurality of grooves to limit movement of the light mount relative to the vehicle mount assembly.

16. The mounting device recited in claim 10, wherein the light mount is pivotable relative to both of the pair of vehicle mounts.

* * * * *